Sept. 19, 1967     G. B. PUMPHREY ETAL     3,342,078
BRAKE RELEASE MEANS
Filed Oct. 1, 1965
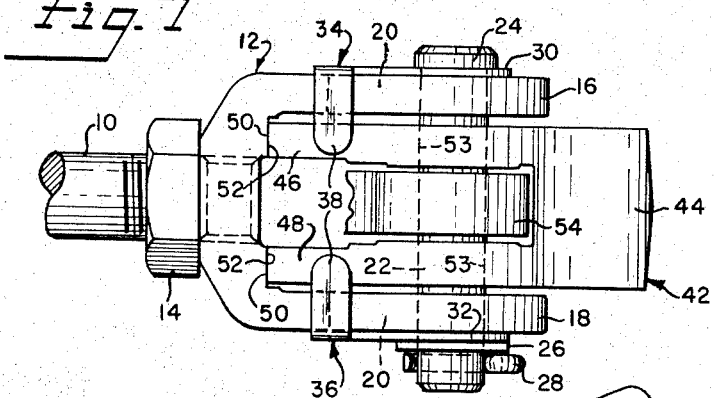
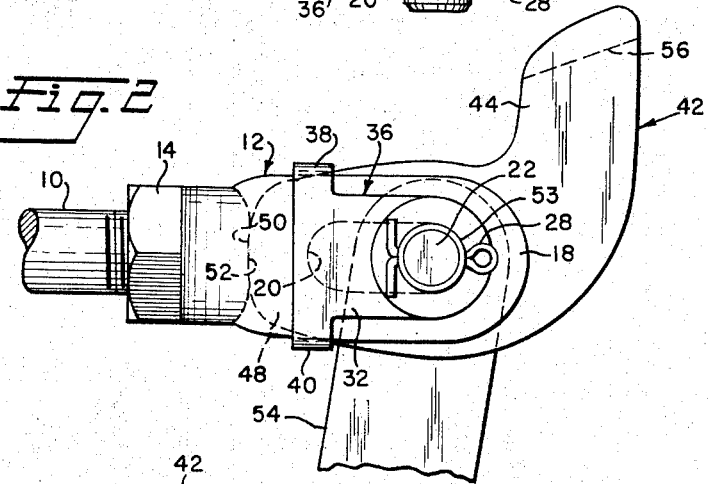
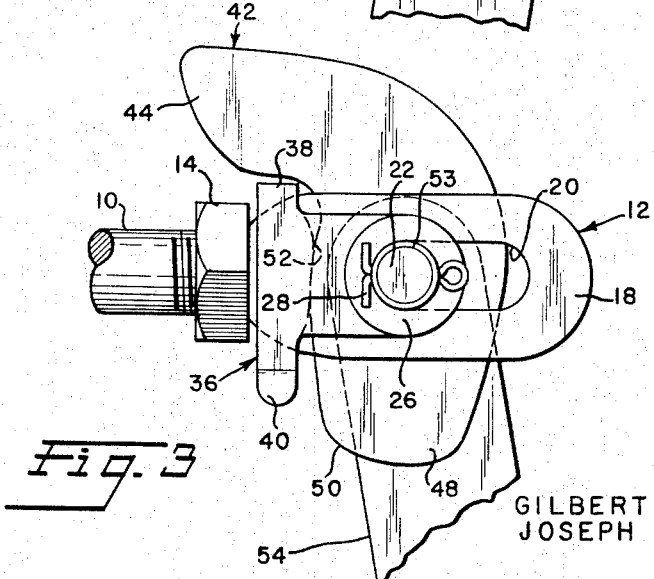
INVENTORS
GILBERT B. PUMPHREY
JOSEPH DUFFALA
BY
*Scrivener Parker Scrivener & Clarke*
ATTORNEYS

United States Patent Office 3,342,078
Patented Sept. 19, 1967

3,342,078
BRAKE RELEASE MEANS
Gilbert B. Pumphrey and Joseph Duffala, Elyria, Ohio, assignors to Bendix-Westinghouse Automotive Air Brake Company, Elyria, Ohio, a corporation of Delaware
Filed Oct. 1, 1965, Ser. No. 492,152
9 Claims. (Cl. 74—102)

This invention relates to release means for brakes and more particularly to a device for selectively manually releasing a mechanically locked-on or mechanically applied brake.

Fluid pressure operated brakes for vehicles frequently have associated with them a safety mechanism which may comprise pressure suspended, spring-actuated applying means or mechanical locking means both of which are effective to retain the brakes in applied condition upon failure of the normal fluid pressure supply. Where no fluid pressure is available, the brakes cannot be released by the normal fluid pressure responsive means and when this type of brake equipment is employed it is desirable to have some manually operable means for releasing the brakes which can be actuated in an emergency by the operator so that a vehicle can be moved.

The broad object of the present invention is to provide for mechanically-applied or locked-on brakes, manually operable brake release means which may be actuated quickly and independently of the brake applying or locking means to effect release of the brakes in an emergency.

More specifically, it is an object of the invention to provide means for selectively and quickly releasing mechanically applied or locked-on brakes by the provision of linkage parts which cooperate with a brake actuator rod and a brake applying lever or slack adjuster and under normal conditions occupy one position to function as integral parts of the brake applying mechanism, with the parts being so arranged that, when necessary, they may be forced out of their first position to a second position wherein the brake lever is effectively disconnected from the rod so that the lever may return to a releasing position independently of the rod.

More particularly it is an object of the invention wherein the brake release means is moved to the second position merely by the blow of a hammer.

Still another object of the invention is to provide brake release means of the foregoing nature which includes novel means for releasably retaining the releasing means in its normal position, said retaining means also providing a shield against road dirt from entering the device.

Other objects and their attendant advantages will become apparent as the following detailed description is read in conjunction with the accompanying drawings wherein:

FIG. 1 is a top plan view of a brake applying rod and slack adjuster incorporating the release means of the present invention;

FIG. 2 is a side elevational view of the structure illustrated in FIG. 1; and

FIG. 3 is a change position view similar to FIG. 2 but showing the device of the invention moving to its brake release position.

Referring now to the drawings, the numeral 10 designates a brake actuating rod which may be connected at one end to a fluid pressure operated brake actuator (not shown) which may include pressure suspended, auxiliary brake appling means such as a spring which applies the brakes mechanically upon loss of pressure or it may include pressure suspended brake-locking means which move automatically into locking position to mechanically lock the brakes in applied position upon the emergency loss of the normal brake operating fluid. For purposes of illustration, the invention will be described as it may be used in conjunction with brake locking means of the type disclosed in the patent to Valentine et al., No. 3,173,726 wherein, upon the fall of operating pressure to a predetermined low value, the brakes are automatically applied and thereafter mechanically locked-on in applied condition with there being no ready means for releasing the locks and hence the brakes until pressure is restored.

Referring again to the rod 10 this is threaded at its outer end to receive a yoke 12 which is locked in place by means of a lock nut 14. The yoke 12 has a pair of arms 16, 18 which have co-extensive longitudinal slots 20 therein slidingly receiving the opposite ends of a pin 22 having an enlarged head 24 at one end and a washer 26 on the opposite end which is retained in place by a cotter pin 28 in the usual manner. The length of the pin 22 between the head 24 and washer 26 is greater than the spacing between the outer faces of the arms 16, 18 in order that there may be accommodate beneath the head and washer the respectively forwardly extending parts 30, 32 of a pair of retaining members 34, 36 having at their rear ends transversely extending, inwardly projecting pairs of bendable upper and lower tabs 38, 40 whose function will hereinafter become apparent.

In accordance with the invention the pin 22 rotatably carries between the arms 16, 18 of the yoke 12 a release member 42 of generally bell crank configuration, having an upwardly extending part 44 and a rearwardly extending part which is slotted or bifurcated to provide a pair of arms 46, 48 whose ends 50 normally engage shoulders or abutments 52 at the inner ends of the arms 16, 18 of the push rod yoke 12. The pin 22 is received in circular openings 53 through the arms 46, 48 which register with the slots 20 in the arms 16, 18 of the yoke 12.

As illustrated in FIG. 1, the pin 22, in addition to the arms 16, 18 of the yoke 12 and the arms 46, 48 of the release member 42 also carries thereon between the arms 46, 48 of the member 42 the upper end of a brake applying lever or slack adjuster 54. With particular reference to FIG. 1, it will be observed that the upper tabs 38, as do also the lower tabs 40 (FIG. 2), of the members 34, 36 extend across the arms 16, 18 of the push rod yoke 12 and overlap the arms 46, 48 of the release member 42 so that the latter is retained in the position of FIG. 1 wherein the ends 50 of the arms 46, 48 are positioned in alignment with the shoulders 52 of the push rod yoke 12 and the pin is positioned adjacent to the ends of the slot 20 remote from the end of the push rod. When a brake applying force is exerted to the right in FIG. 1 on the rod 10 this force is transferred by the abutments 52 to the ends 50 of the release member 42 which thereupon exerts a force on the pin 22 and from this to the slack adjuster 54 to apply the brakes, it being understood that during normal conditions the brakes are applied and released exactly as if the release member did not exist, or expressed differently as if it were an integral part of the yoke 12.

Assume now that due to emergency conditions, the brakes are automatically applied and locked in applied position with a subsequent total loss of fluid pressure, particularly pressure for moving the locking means to unlocking position. Under these conditions the vehicle is substantially immobilized and should, for some reason, it now becomes necessary to move the vehicle, the operator merely strikes a hammer blow against the upper upstanding part 44 of the member 42 to cause it to rotate in either direction. As can be seen, the slot or bifurcation in the member 42 extends through the major portion thereof and terminates near the outer end of the arm 44 along the line 56 so that the member 42 can be rotated in either direction about the pin 22 without engaging the slack adjuster 54 until the ends 50 of the arms 46, 48 are moved out of alignment with the shoulders 52 of the push rod yoke member 12. Upon this occurrence the brake shoe return springs (not shown) operate on the slack adjuster 54 to move this to the left in FIGS. 2 and 3 so that the pin 22 slides freely in the slots 20 in the arms 16, 18 of the yoke 12 to the left hand end thereof as shown in FIG. 3 to release the brake, entirely independently of the push rod or locks.

An important feature of the invention is that the tabs 38, 40 of the retaining members 34, 36 are bendable, preferably mild steel whereby when the release member 42 is struck with sufficient force, either the upper tabs 38 or the lower tabs 40 depending upon which direction the member 42 is rotated are bent outwardly by the adjacent edges of the arms 46, 48 of the member 42 until the tabs are clear of the arms 46, 48 so that the member 42 moves fully to releasing position. For example, if the member is struck so as to rotate counter clockwise the lower tabs 40 are bent outwardly and as the pin 22 and slack adjuster move to the left, the retainers 34, 36 are also slid to the left as clearly illustrated in FIG. 3.

When normal conditions have been restored and the release member 42 has been returned to the position of FIG. 2, the operator merely bends back, as by light hammer blows, the particular tabs which have been bent outwardly during release, to the retaining position of FIG. 1.

Those skilled in the art will recognize that the invention is susceptible of a variety of changes and modifications without however, departing from the scope and spirit of the appended claims.

What is claimed is:

1. In combination, a brake applying rod having an axially extending slot therein, a brake lever having a part registering with said slot, a pin operatively connected to said part and slidingly received in said slot, an abutment integral with said rod, a brake releasing member rotatably connected to said brake lever and having an end part engaging said abutment to positively position said pin and brake lever toward an end of said slot, and means integral with said member for effecting rotation of the same until the end thereof is clear of said abutment so that said pin, and consequently said brake lever, has freedom of movement in said slot independently of said rod.

2. In combination, a brake applying rod having an axially extending slot in the end thereof, a brake lever adjacent the end of said rod and having a part registering with said slot, a pin operatively connected to said part and slidingly received in said slot, an abutment integral with said rod inwardly of said slot, a brake releasing member rotatably received on said pin and having an end part radially spaced from said pin and engaging said abutment to positively position said pin and said brake lever at the outer end of said slot, and means integral with said member for rotating the same until the end thereof is clear of said abutment so that said pin, and consequently said brake lever, are free to move toward the inner end of said slot independently of said rod.

3. The combination of claim 2 including clip means carried by said rod for releasably retaining the end of said release member in engagement with said abutment, said clip means including bendable tab means engaging said release member and being bendable thereby clear of said member when the latter is rotated.

4. In combination, a brake applying rod, a yoke connected to the end of said rod and having a pair of axially extending laterally spaced arms, longitudinal, coextensive slots in said arms, a brake lever having a free end extending between said arms, pin means extending laterally from opposite sides of said brake level and slidingly received in the slots in the arms of said yoke, abutment means carried by said yoke between said arms at the inner ends thereof, a brake releasing member rotatably received on said pin means between said arms and having an end part radially spaced from said pin in arms and engaging said abutment means to positively position said pin means and said brake lever adjacent the outer end of said slot, and manually operable means integral with said releasing member for rotating it about the axis of said pin means until the end of said member is clear of said abutment means so that said pin means and said brake lever are free to move toward the inner ends of said slots independently of said brake rod.

5. The combination of claim 4 wherein said brake releasing member is of generally bell crank construction wherein one arm normally extends between said pin means and said abutment and the other arm extends freely and angularly away from said pin means into a position for receiving a hammer-like blow to effect rotation of said arm clear of said abutment.

6. In combination with a brake applying rod having longitudinal slot means at the outer end thereof, a brake lever having a part registering with said slot means, pin means connected to said lever part and slidingly engaging said slot means, an abutment on said rod adjacent an end of said slot and in axial alignment therewith, a brake release element rotatably connected to said pin means and having an end radially spaced from said pin means and engaging said abutment to retain said pin means and brake lever adjacent the outer end of said slot, a clip having an end connected to said pin means, inwardly extending, bendable tabs on the other end of said clip and extending laterally and freely across said rod and said brake release element for retaining said element in an axial aligned position between said abutment and said pin means, and means integral with said release element for the reception of a hammer blow to rotate said element against said tabs to bend the same clear of said element whereby said element may be moved to releasing position.

7. The combination of claim 6 wherein said clip is slidingly received on said rod and is movable with said pin means and said brake applying lever with respect to said slot upon movement of said element to releasing position.

8. The combination of claim 6 wherein said element is rotatable in either direction to releasing position and wherein said clip means includes tabs on opposite sides of said element.

9. The combination of claim 6 wherein said element is a bifurcation wherein said brake lever is received on said pin means between the arms of said bifurcation.

References Cited

UNITED STATES PATENTS

| 1,889,014 | 11/1932 | Bledsoe | 303—89 |
| 2,108,132 | 2/1938 | Searle | 303—89 |
| 2,369,362 | 2/1945 | Marziani. | |
| 3,075,401 | 1/1963 | Chapman | 188—265 |
| 3,237,463 | 3/1966 | McPherson | 74—106 |

FRED C. MATTERN, Jr., *Primary Examiner.*

W. S. RATLIFF, *Assistant Examiner.*